United States Patent Office 2,891,935
Patented June 23, 1959

2,891,935
CONTROL OF DEPOSITS ON CATALYSTS
William C. Lanning, Bartlesville, Okla., assignor to Phillips Petroleum Company, a corporation of Delaware No Drawing. Application December 21, 1954
Serial No. 476,856

17 Claims. (Cl. 260—93.7)

This invention relates to olefin polymerization. In one aspect, it relates to a method of controlling molecular weight distribution in a polymer. In another aspect, it relates to a method for increasing the useful life of a polymerization catalyst.

It has recently been discovered that aliphatic 1-olefins having a maximum chain length of 8 carbon atoms and no branching nearer the double bond than the 4-position can be polymerized to form novel polymers ranging in properties from heavy viscous oils and tacky solids to brittle or flexible solid polymers by contacting such olefins, often in admixture with an inert liquid hydrocarban solvent, with a catalyst comprising chromium oxide, including a substantial amount of hexavalent chromium, associated with at least one oxide selected from the group consisting of silica, alumina, thoria and zirconia at a polymerization temperature in the range 150 to 450° F. This process is described in more detail in the copending application of J. P. Hogan and R. L. Banks, Serial No. 476,306, filed December 20, 1954, which is a continuation-in-part of application Serial No. 333,576, filed January 27, 1953, both of said applications now abandoned.

In a polymerization process of the type described, an appreciable part of the product polymer is deposited on the surface or in the pores of the catalyst. While a large portion of the deposited polymer can be recovered by extraction of the catalyst with a suitable solvent, there is an appreciable portion which is not readily recovered in this manner. This portion appears to be a polymeric fraction of very high molecular weight. Continued accumulation of the heavy polymer on the catalyst results in a decrease in the catalytic activity, apparently as a result of covering of the catalyst surface, and a disintegration or spalling of the catalyst particles. These phenomena are particularly noticeable in connection with a proces wherein a fixed bed of catalyst is utilized, but are also observed in processes utilizing a mobile catalyst. In the latter type of process, the most apparent results are a decrease in the catalyst activity and the formation of catalyst fines which are sometimes difficult to remove from the product. It is clearly desirable to eliminate or minimize the formation of the described heaviest fractions of polymer and still produce a readily recoverable normally solid polymer of the type desired.

The present invention reduces the amount of very heavy polymer formed in an olefin polymerization process of the type above described, and consequently increases the time period during which the catalyst can be used without reactivation or regeneration.

According to this invention, the chromium oxide polymerization catalyst is subjected to a novel preliminary treatment, prior to utilization in the polymerization of the 1-olefin to obtain normally solid polymer. The material used to treat the catalyst preliminarily is, in general, an olefin having a higher molecular weight than the olefin which is to be converted to normally solid polymer. The treating agent is an aliphatic olefin having at least 4 carbon atoms per molecule and is preferably a normally liquid olefin. More preferably, the treating agent is a normally liquid olefin having a non-terminal double bond and is still more preferably an olefin having a non-terminal double bond and at least 6 carbon atoms per molecule. Specific olefins suitable as catalyst treating agents are 1-butene, 2-butene, 1-pentene, 2-pentene, 1-hexene, 2-hexene, 3-hexene, 1-heptene, 2-heptene, 1-octene, and 2-decene. A suitable material for this purpose is the light polymer which is produced in the polymerization cycle itself and which is soluble in the hydrocarbon reaction medium or solvent at temperatures from about 70 to about 150° F. and preferably at temperatures from approximately 100 to approximately 150° F. The reaction medium or solvent, as more fully discussed in the cited applications of Hogan and Banks, is a hydrocarbon which is liquid and chemically inert under the polymerization conditions and is generally selected from the group consisting of paraffinic and napthenic hydrocarbons, especially those having from 3 to 12, preferably 5 to 12, carbon atoms per molecule.

It is generally desirable that the catalyst treating agent be utilized in admixture with the hydrocarbon solvent or reaction medium which is used in connection with the polymerization process. The concentration of the olefinic treating agent in the solvent is generally in the range from 0.2 to about 10 weight percent; higher or lower concentrations can, however, be used.

The pretreatment according to this invention is carried out by contacting the treating agent with the freshly prepared or regenerated and activated catalyst at approximately the same temperature and pressure conditions as the polymerization process itself, i.e., a temperature in the range 150 to 450° F. The pressure is preferably sufficient to maintain liquid phase conditions, i.e., in the range of about 100 to about 700 p.s.i.; however, pressures outside this range can be utilized. The time required for the preliminary treatment depends upon the temperature, the specific treating agent and the concentration of the treating solution where a solution of olefin in inert solvent in used. A treating time in the range 15 minutes to 10 hours produces satisfactory results.

A preferred temperature range for the preliminary treating step is in the range 175 to 350° F. and more preferably 250 to 350° F.

The preliminary treatment step according to this invention is particularly applicable to a fixed-bed catalytic polymerization process wherein at least one olefin selected from the group consisting of ethylene and propylene is polymerized to form normally solid polymers. This includes processes wherein ethylene and propylene are copolymerized in any desired proportion. However, in its broadest aspect, the invention is not limited to a fixed bed process or to the polymerization of ethylene and/or propylene.

In one specific embodiment of this invention, a freshly prepared catalyst, prepared by treating a commercial cracking catalyst which is a coprecipitated gel comprising 90 weight percent silica and 10 weight percent alumina with an aqueous solution of chromium trioxide sufficient to obtain a final composite containing from 1 to 10 weight percent of chromium in the form of chromium oxide and containing at least 1 weight percent of hexavalent chromium, is utilized in the form of a fixed bed, after activation in a stream of dry air at a temperature in the range 900 to 950° F. The catalyst is treated, prior to use in polymerization, by contacting with a solution of 2-hexene in isooctane (2,2,4-trimethylpentane). This treatment is conducted at approximately 325° F. and a pressure sufficient to maintain the treating mixture in the liquid phase and is continued for a period of approximately 1 hour. At the end of this time, a mixture comprising 2 weight percent of ethylene in 2,2,4-trimethylpentane is contacted with the treated catalyst at approximately 330° F. and 600 p.s.i. and at a liquid hourly space velocity of 2. The reaction effluent is passed to a fractionation zone in which the isooctane is separated from the solid polymer by flashing. Solid polyethylene is recovered as a kettle product.

After continuation of the ethylene polymerization for a period of several hours, the catalyst activity declines, at which time the polymerization is interrupted, and isooctane at a temperature of approximately 350° F. is passed through the catalyst to extract polymer deposited thereon. The extracted polymer is recovered by flashing the solvent, as previously described.

The catalyst is then regenerated by contact with a mixture comprising 2 percent oxygen and 98 percent nitrogen at a temperature of from 900 to 1100° F. and a gaseous space velocity (STP) of from 100 to 1000 volumes per volume per hour to effect smooth combustion of carbonaceous deposits, and is subsequently activated by heating for a period of from 1 to 10, e.g., 6, hours in dry air (not over 0.1 weight percent water content) at from 900 to 1400, e.g., 950° F.

The generated and activated catalyst is then contacted for one hour with the solution of 2-hexene in isooctane, as previously described. At the end of this period, the ethylene polymerization is resumed.

In another embodiment of this invention, the ethylene polymerization is conducted as previously described, and the effluent from the catalyst chamber is passed to a cooling zone wherein the temperature is reduced to approximately 100° F. and dissolved polyethylene precipitates out. The precipitated polyethylene is recovered by filtration. The supernatant liquid recovered as filtrate is collected and, after regeneration and reactivation of the catalyst, as previously described, is used as the treating solution, the preliminary treatment of the regenerated and activated catalyst being conducted, as previously described, immediately prior to the polymerization cycle.

From the foregoing, it will be evident that, in a fixed-bed process according to this invention, a given mass of catalyst can be subjected to four cycles, the first being the preliminary treatment with olefinic treating agent, the second being a polymerization cycle in which ethylene and/or propylene, for example, is converted to normally solid polymer or copolymer, the third being an extraction cycle in which deposited polymer is extracted from the catalyst by means of a solvent, and the fourth being a regeneration and reactivation cycle. It will be clear to those skilled in the art that four or more fixed-bed reactors can be maintained in parallel, each being subjected to one of the cycles of the process previously described, while each of the others is being subjected to another cycle of said process. This arrangement of reactors is well known in the art and requires no further description here.

*Example*

A series of runs was conducted in which a feed comprising 2.0 weight percent ethylene, 0.6 weight percent ethane, and 97.4 weight percent 2,2,4-trimethylpentane was contacted with a fixed bed of catalyst comprising 2.5 weight percent chromium in the form of chromium oxide including hexavalent chromium, deposited on a coprecipitated gel comprising 90 weight percent silica and 10 weight percent alumina. The contacting was conducted at 330° F., 450 p.s.i. and a liquid hourly space velocity of 6 for a period of 10 hours. The effluent from the reactor was flashed to remove isooctane. The portion of the total product polymer which was in solution in the reactor effluent and that portion which was deposited on the catalyst and extractable therefrom with isooctane at about 350° F. were determined. Also, the total amount of polymer deposited on the catalyst and not extracted therefrom by isooctane at 350° F. was determined.

In one run, the catalyst was used, after activation at 900 to 950° F. in a stream of dry air, without any preliminary treatment. In the other runs, the catalyst was preliminarily treated according to this invention for a period of one hour immediately prior to the ethylene polymerization. The preliminary treatment was conducted at a temperature of 300 to 330° F. and a pressure sufficient to maintain the treating agent substantially completely in the liquid phase. In one run, the treating agent was a 10 weight percent solution of 2-hexene in 2,2,4-trimethylpentane. In another run, the treating agent was a 10 weight percent solution of 1-hexene in 2,2,4-trimethylpentane. In another run, the treating agent was a 5 weight percent solution of 1-butene in 2,2,4-trimethylpentane.

The results are shown in the following table.

| Run No. | Preliminary Treating Agent | Average Conversion, percent | Catalyst Deposit, percent[a] | Percent of Ethylene Converted to— | | |
|---|---|---|---|---|---|---|
| | | | | i-$C_8$ sol. | i-$C_8$ insol. | Cat. Dep. |
| 1 | 2-Hexene | 93 | 4.6 | [b]10.7 | 85.8 | 3.5 |
| 2 | 1-Hexene | 88 | 5.7 | [b]10.5 | 85.0 | 4.5 |
| 3 | None | 96 | 11.0 | 4.8 | 86.2 | 9.0 |
| 4 | 1-Butene | 92 | 6.7 | | | |

[a] Percent gain in weight of catalyst due to unextracted deposits.
[b] Probably includes some hexene polymer as recovery was high (110%).

In the run in which 2-hexene was used as the treating agent according to this invention, the product polymer extracted from the catalyst had a molecular weight of 11,300 as determined by intrinsic viscosity measurement, a density of 0.956 at 20° C., a flexibility rating, according to the falling ball test, of 6 inches, and a melting point of 244° F.

The polymer extracted from the catalyst in the run in which 1-hexene was used as the preliminary treating agent had a molecular weight of 10,500, a density at 20° C. of 0.959, and a melting point of 243° F. This polymer was too britle for a flexibility measurement.

The foregoing data show that preliminary treatment according to this invention materially reduces catalyst deposits and still allows the production of a satisfactory polyethylene. The data further show that 2-hexene is more effective than 1-hexene and that 1-hexene is more effective than 1-butene as a treating agent.

Instead of isooctane, cyclohexane, methylcyclohexane, normal pentane, isopentane, normal decane and the isononanes can be used as the solvent or reaction medium.

The preliminary treatment according to this invention is also applicable to a finely divided catalyst, e.g., 20 to 60 mesh, in a process in which the catalyst is utilized as a suspension in the reaction mixture.

Those skilled in the art will be able to effect numerous variations and modifications within the scope of the disclosure and the claims to this invention. The essence of this invention is that, in a process in which an olefin is polymerized to normally solid polymer by contact with a composite chromium oxide polymerization catalyst, improved results are obtained by preliminarily treating the catalyst, prior to said polymerization, with an aliphatic olefin having a higher molecular weight than the olefin converted to said solid polymer.

I claim:

1. In a process wherein an olefinic hydrocarbon selected from the group consisting of ethylene and propylene is polymerized to normally solid polymer by contacting with a catalyst consisting essentially of chromium oxide, including hexavalent chromium, associated with at least one member of the group consisting of silica, alumina, zirconia and thoria, the improvement which comprises contacting said catalyst with an aliphatic olefinic hydrocarbon selected from the group consisting of butenes and normally liquid hydrocarbons, at temperature and pressure conditions suitable for the formation of said solid polymer in the presence of said catalyst, prior to contacting the catalyst with said first-mentioned hydrocarbon.

2. In a process wherein an olefinic hydrocarbon selected from the group consisting of ethylene and propylene is polymerized to normally solid polymer by contacting with a composite catalyst consisting essentially of chromium oxide, including hexavalent chromium, associated with at least one additional oxide selected from the group consisting of silica, alumina, thoria and zirconia at a temperature in the range 150 to 450° F., the improvement which comprises preliminarily contacting said catalyst with an aliphatic olefinic hydrocarbon selected from the group consisting of butenes and normally liquid hydrocarbons at a temperature in the range 150 to 450° F., in the absence of propylene and of ethylene, prior to contacting said catalyst with said first-mentioned hydrocarbon.

3. A process according to claim 2 wherein the olefin which is polymerized and the aliphatic olefinic hydrocarbon are each in admixture with a hydrocarbon selected from the group consisting of paraffins and naphthenes which are liquid and inert under the polymerization conditions.

4. A process according to claim 2 wherein the polymerization and the preliminary contacting are conducted at a temperature in the range 175 to 350° F. and a pressure sufficient to maintain the hydrocarbons substantially in the liquid phase, and the time of contacting said catalyst with said aliphatic olefin is within the range 15 minutes to 10 hours.

5. A process according to claim 4 wherein the preliminary contacting is conducted at a temperature in the range 300 to 330° F.

6. A process according to claim 2 wherein said aliphatic olefinic hydrocarbon is a normally liquid olefin having a non-terminal double bond.

7. A process according to claim 2 wherein said aliphatic olefinic hydrocarbon is a normally liquid olefin having a non-terminal double bond and at least 6 carbon atoms per molecule.

8. A process according to claim 2 wherein said aliphatic olefinic hydrocarbon is 1-hexene.

9. A process according to claim 2 wherein said aliphatic olefinic hydrocarbon is 2-hexene.

10. A process according to claim 2 wherein said aliphatic olefinic hydrocarbon is light polymeric material which is produced in the olefin polymerization process and which is soluble at a temperature in the range 100 to 150° F. in a hydrocarbon solvent selected from the group consisting of paraffins and naphthenes which are liquid and inert under the polymerization conditions.

11. A process according to claim 2 wherein said aliphatic olefinic hydrocarbon is 1-butene.

12. A process according to claim 2 wherein said aliphatic olefinic hydrocarbon is 2-heptene.

13. A process according to claim 2 wherein the preliminary contacting is conducted at a temperature in the range 175 to 350° F.

14. A process according to claim 2 wherein the preliminary contacting is conducted at a temperature in the range 250 to 350° F.

15. A process which comprises contacting an aliphatic olefin selected from the group consisting of butenes and normally liquid olefins with a polymerization catalyst consisting essentially of chromium oxide including hexavalent chromium and at least one member of the group consisting of silica, alumina, zirconia and thoria and subsequently contacting, with said catalyst, a 1-olefin having a maximum chain length of 8 carbon atoms and no branching nearer the double bond than the 4-position, said contacting with each of said olefins being conducted under temperature and pressure conditions suitable for the formation of normally solid polymer of the second-mentioned olefin in the presence of said catalyst, and the first-mentioned olefin having a higher molecular weight than the second-mentioned olefin.

16. A process which comprises contacting an aliphatic olefin selected from the group consisting of butenes and normally liquid olefins with a composite polymerization catalyst consisting essentially of chromium oxide, in which at least part of the chromium is in the hexavalent state, and at least one member of the group consisting of silica, alumina, zirconia and thoria and subsequently contacting, with said catalyst, an aliphatic 1-olefin having a maximum chain length of 8 carbon atoms and no branching nearer the double bond than the 4-position and having a lower molecular weight than the first-mentioned olefin, said contacting with each of said olefins being conducted at a temperature up to 450° F.

17. In a process wherein a 1-olefin having a maximum chain length of 8 carbon atoms and no branching nearer the double bond than the 4-position is polymerized to solid polymer by contacting with a catalyst consisting essentially of chromium oxide, in which at least part of the chromium is in the hexavalent state, and at least one member of the group consisting of silica, alumina, zirconia and thoria, at a temperature in the range 150 to 450° F., the improvement which comprises treating said catalyst, prior to the aforementioned contacting, with an aliphatic olefin selected from the group consisting of butenes and normally liquid olefins having a higher molecular weight than said 1-olefin, said treating being effected at a temperature in the range 150 to 450° F.

References Cited in the file of this patent

UNITED STATES PATENTS

| | | |
|---|---|---|
| 2,332,276 | Stahly | Oct. 19, 1943 |
| 2,692,257 | Zletz | Oct. 12, 1954 |
| 2,700,663 | Peters | Jan. 25, 1955 |